Feb. 13, 1968    J. W. COPELAND    3,368,748
TIME, SPEED AND DISTANCE COMPUTER
Original Filed March 1, 1965    3 Sheets-Sheet 1

INVENTOR.
JOHN W. COPELAND

INVENTOR.
JOHN W. COPELAND

Feb. 13, 1968  J. W. COPELAND  3,368,748
TIME, SPEED AND DISTANCE COMPUTER
Original Filed March 1, 1965   3 Sheets-Sheet 3

INVENTOR.
JOHN W. COPELAND

United States Patent Office 3,368,748
Patented Feb. 13, 1968

3,368,748
TIME, SPEED AND DISTANCE COMPUTER
John W. Copeland, 161 S. Oliver,
Wichita, Kans. 67218
Original application Mar. 1, 1965, Ser. No. 436,129, now Patent No. 3,282,501, dated Nov. 1, 1965. Divided and this application July 14, 1966, Ser. No. 574,852
2 Claims. (Cl. 235—71)

ABSTRACT OF THE DISCLOSURE

This invention relates to computing devices, more particularly to computing devices for correlating time, speed, and distance variables. Still more specifically, this invention relates to computing devices which utilize linear scales that are easy to read and to interpolate, which devices are simple to manipulate in operation. Additionally, this invention relates to a rectangular-shaped computer device having a laterally movable pointer means mounted thereon operable to readily indicate time of arrival and time elapsed for travelling various distances at given ground speed velocities.

---

This is a division of application Ser. No. 436,129, filed Mar. 1, 1965, now Patent No. 3,282,501.

In flying it is the usual procedure to draw a line on a map to depict the intended flight or course of the plane. In order to make certain that the actual flight path of the plane responds to the projected flight path, check points are periodically noted on the map which occur along the projected flight path. Check points are normally prominent visible geographical objects or landmarks that can be identified. The distance between check points can be scaled from the map, and the ground speed of the plane calculated fairly accurately taking into account the air speed of the plane and the prevailing wind. In order to positively assure the pilot that he is on course and on schedule, he will normally compute the elapsed time between check points and also the time of arrival at the next check point from a consideration of distance and velocity. This computation, while not extremely complex, can be very confusing when done under flight conditions, particularly for an inexperienced pilot. The computation must ordinarily be done fairly rapidly after each check point has been passed in order to calculate the estimated time of arrival at the next check point. If the task of flying the plane is demanding, or the flight path must be corrected due to drift, etc. the activity could well cause an error which could be very serious.

Computers for calculating the factors involved in flying are known. However, the known computers are relatively complex to operate. In general, these known computers embody logarithmic scales which for the average person are difficult to read and to interpolate. To the inexperienced pilot the use of known type computers to calculate routine calculations can be very confusing. If the computer must be used to correct or evaluate the ground velocity or the flight path, as is frequently the case, the known computer devices are particularly confusing and therefore generally unsatisfactory. In some instances their use can be dangerous if such use results in an incorrect calculation and the result of the calculation is relied on. When the error is subsequently noticed, the situation can be very frightening for an inexperienced pilot further compounding confusion.

I have invented a new computer. The new computer of my invention has a first element having indicating means, first unit indicia, and a plurality of unit scale indicia thereon. A second element is secured to the first element for relative movement therebetween. A second unit indicia, corresponding to the first unit indicia is provided on the second element. A plurality of indicating indicia are correlated with the unit scale indicia. A preferably movable pointer means is provided as a correlating means.

The new computer of my invention solves all of the problems common to computers known to the prior art. The new computer of my invention is particularly adapted to be used in flying to calculate elapsed time, time of arrival, velocity, etc., but can also be used to calculate other variables in other applications. All of the indicia and scales on the computer of my invention are linear in nature, thereby making same easy to read, and to interpolate. Further, my computer involves a very minimum number of elements, which makes the manipulation of same very simple and easy to master. The indicia depicting the variables is arranged in a logical manner making the use and manipulation of the computer of my invention practically foolproof. This is very important when the pilot is under stress or tension because it operates to reduce the likelihood of errors. Due to the logical arrangement of the variables, the computer can be conveniently used to correct the flight path of the airplane in the event that the plane is inadvertently drawn off course, evaluate ground speed, etc. The computer of my invention is very easy an inexpensive to manufacture, which would place same within easy reach of many persons otherwise unable to afford conventional calculating devices.

An object of this invention is to provide a new computer means.

Another object of this invention is to provide a new computer particularly adapted to correlate time, speed and distance.

Yet another object of this invention is to provide a new computer that is easy to read and to interpolate.

Another object of this invention is to provide a new computer in which the variables are logically arranged making manipulation and use of the computer relatively simple to the uninitiated person.

Still another object of this invention is to provide a new computer that can be used for a wide variety of applications by merely placing thereon indicia depicting the variables in the proper ranges.

Another object of this invention is to provide a new computer that is relatively inexpensive to manufacture.

Other objects and advantages of the new computer means of my invention will be apparent to those skilled in the art upon reading this disclosure.

Drawings accompany and are a part of this disclosure. There drawings depict preferred specific embodiments of the new computer of my invention, and it is to be understood that such drawings are not to unduly limit the scope of my invention. In the drawings, FIG. 1 is a top plan view of a preferred specific embodiment of the computer of my invention particularly adapted to be mounted on the instrument panel, or other flat surfaces of an airplane, vehicle, or the like.

Figure 1:
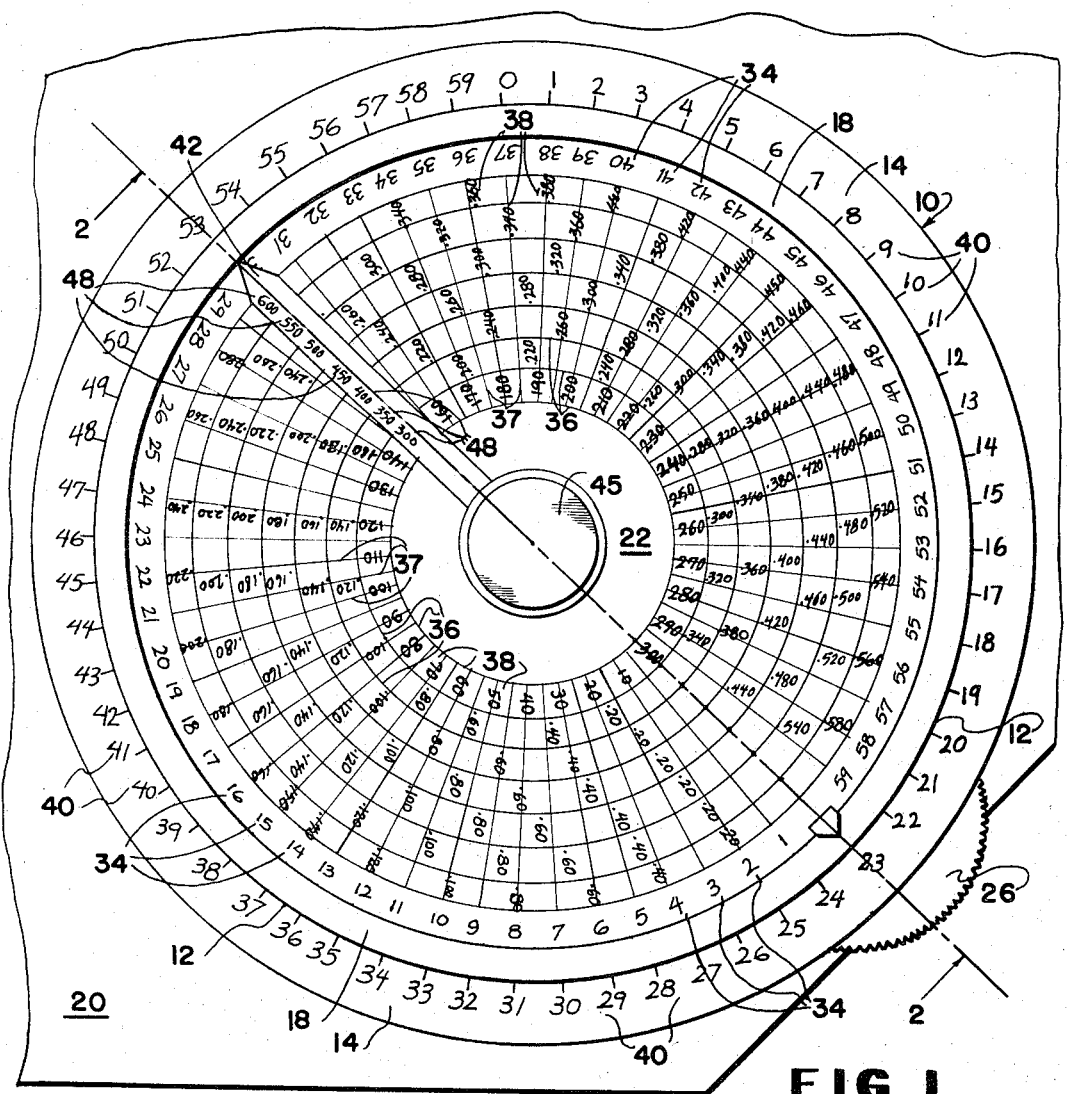

The following is a discussion and description of the new computer of my invention made with reference to the drawings, wherein the same reference numerals are used to indicate the same or similar parts and/or structure. The discussion and description is of preferred specific embodiments of the new computer of my invention, and it is to be understood that such are not to unduly limit the scope of my invention.

Figure 2:
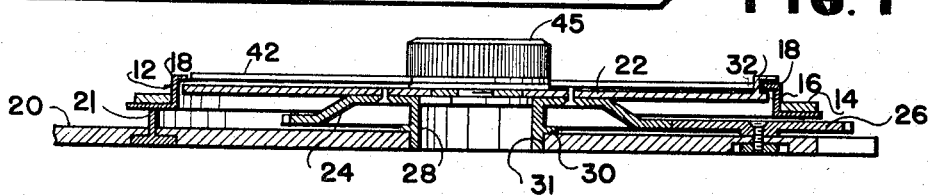
FIG. 2 is a cross sectional view taken on line 2—2 of FIG. 1.
Figure 3:
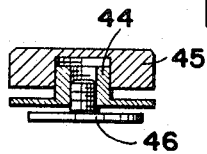
FIG. 3 is a detail view illustrating the knob structure of the embodiment shown in FIG. 1.

Referring now to the figures of the drawings, there is depicted in FIGS. 1–3, a preferred specific embodiment 10 of the computer of my invention for correlating time of travel, time of arrival, distance, and velocity. The computer 10 is particularly adapted to be mounted on the instrument panel 20 or other flat surface of an airplane, the dashboard of an automobile, or the like. The computer 10 has an annular element 12 adapted to be secured to an instrument panel or other flat surfaces. The annular element 12 has a flat annular portion 14, a projecting cylindrically shaped portion 16 joined to the inside edge of annular surface 14, and an inwardly projecting flage 18 on the projecting end of cylindrically shaped portion 16. The annular element 12 can be suitably secured to a flat surface 20, depicting an instrument panel or the like, with an upwardly projecting portion 21 secured to the annular element 12 and to flat surface 20. Annular element 12 can be mounted on the flat surface, however, in any other suitable manner, as for example with bolts and spacer elements.

A disc 22 is disposed within the projecting cylindrically shaped portion 16 of annular element 12 in abutting engagement with the inwardly projecting flange 18. This relationship is shown most clearly in FIG. 2 of the drawings. A gear 24 is mounted on the underside of disc 22 as most clearly shown in FIG. 2. A second gear 26 is positioned in driving engagement with gear 24 and has a portion thereof extending beyond annular element 12 as most clearly shown in FIG. 1. As is believed evident, the extending portion of gear 26 can be rotated manually, which in turn rotates the larger gear 24, in turn rotating disc 22 relative to the annular element 12. A shaft 28 is secured to gear 24 and is provided with a projecting flange 30 in engagement with flat surface 20. A portion of shaft 28 extends through an aperture 31 in flat surface 22 to rotatably mount the gear 24 and disc 22 relative to the surface and annular element 12. A radially extending projection 32 is mounted on disc 22 adjacent the edge of the disc and preferably overlies the annular flange 18. This relationship is most clearly shown in FIG. 2 of the drawings. Time scale indicia 34, consisting of consecutive numeral indicia from 0 to 60, is provided on the periphery of disc 22. As shown in FIG. 1, the indicia 34 start at the projection 32 and progress clockwise about the periphery of the disc 22. The function of indicia 34 will be explained hereinafter. A plurality of spaced concentric circle indicia 36 is provided on disc 22. Radially extending indicia 37 can also be provided, if desired. Distance scale indicia 38 depicting various scales are positioned on the disc 22 and arranged between the concentric circle indicia 36. As is believed evident in FIG. 1, the distance scale indicia begin at zero on the radially extending line indicia 37 passing through the center of pointer 32 and progress clockwise about the disc. A single distance scale is positioned between each pair of the concentric line indicia on the disc. A second time scale indicia 40 is provided on the flat surface 14 of the annular elements 12. The time indicia 40 correspond in value and spacing to time indicia 34 on disc 22.

A pointer 42 is rotatably mounted in the center of disc 22 as most clearly shown in FIG. 1. The pointer 42 has an aperture at one end thereof which receives a threaded bolt 44. The structure of the bolt is most clearly shown in FIG. 3. A knob 45 is threadedly received on bolt 44. The center of bolt 44 has a threaded aperture which receives a second bolt 46. As most clearly shown in FIG. 2 the bolt 46 is positioned in an aperture in disc 22 with the bolt 44 disposed on the top thereof. The disc 22 is firmly secured between the heads of bolts 46 and 44. The knob 45 secures the pointer 44 to the disc. The pointer 42 can be locked relative to disc 22 by turning the knob 44 into tight engagement thereby forming a firm frictional engagement between the head of bolt 44 and the pointer 42. As indicated on FIG. 1, a plurality of velocity indicating indicia 48 are positioned longitudinally along pointer 42. The velocity indicia 48 are positioned in alignment with the distance indicating scale indcia 38 on disc 22. The distance scale indicia on the disc 22 are arranged to correlate distance traveled with velocity and time as indicated by the velocity indicating indicia 48 on pointer 42 and the time scale indicia 34 on the periphery of disc 22. The computer of my invention is adapted to indicate the correlation between time of arrival, time elapsed, distance, and velocity.

In normal use the elapsed time between check points is normally less than an hour. The indicia 34 is preferably in increments of one hour with each of the numbers depicting the minutes of the hour. The velocity indicating indicia 48 on the pointer 42 can be of any suitable value, and are indicated from 300 to 600 miles per hour in the preferred specific embodiment. The distance indicating indicia are all based on the velocity indicating indicia on the pointer. For example the innermost distance indicating scale indicates that 300 miles of distance is covered when a moving object or plane travels at 300 miles per hour for an interval of 60 minutes.

The following is an example of a typical problem that can be simply solved with the computer of my invention. Supposing that the last check point along a plotted course was sighted at twenty-three minutes after the hour, the pointer 32 is set at number 23 as indicated in FIG. 1. Assuming that the velocity of the plane relative to the ground is 600 miles an hour and the distance to the next check point is 300 miles, the pointer is set over numeral 300 in the outermost scale underlying 600 on velocity indicating indicia. The pointer then indicates that there will be an elapsed time of 30 minutes between check points and that the actual time that the check point will be reached will be 53 minutes after the hour. Conversely, the actual ground velocity of the plane can be determined by utilizing the time elapsed and the distance. For example, let us assume that the total elapsed time between check points is 30 minutes, that the distance is 275 miles and that the air velocity is unknown. The pointer 42 is placed on the scale indicia 30 and the distance scales underlying the pointer are inspected to determine which of the scales indicate the correct distance. It will be noted that the second scale from the outside indicates that when a distance of 275 miles is covered in 30 minutes, the velocity relative to the ground as read from the pointer is then determined to be 550 miles per hour. By this method one can compute the actual ground velocity of a moving object.

Any suitable values can be depicted by the indicia utilized on my computer to solve any suitable type of problem. For example, a common type problem used in flying is to determine the correlation between distance, gallons of fuel, total time of flight remaining, and estimated time that the fuel will be exhausted. In such an application, the indicia 38 can be used to indicate distance, indicia 48 to indicate the gallons of fuel at any given time, the indicia 34 used to indicate the total time of flight remaining, and the indicia 40 used to estimate the estimated time that the fuel will be exhausted.

Another typical application of the computer of my invention is in sport car rallies where each car is directed along an unknown course and instructed to proceed at various speeds for certain distances until certain check points are reached. The computer adapted for such an application would have velocity indicating indicia and distance scales considerably smaller in magnitude than the scales indicated on the preferred embodiment.

Figure 4:
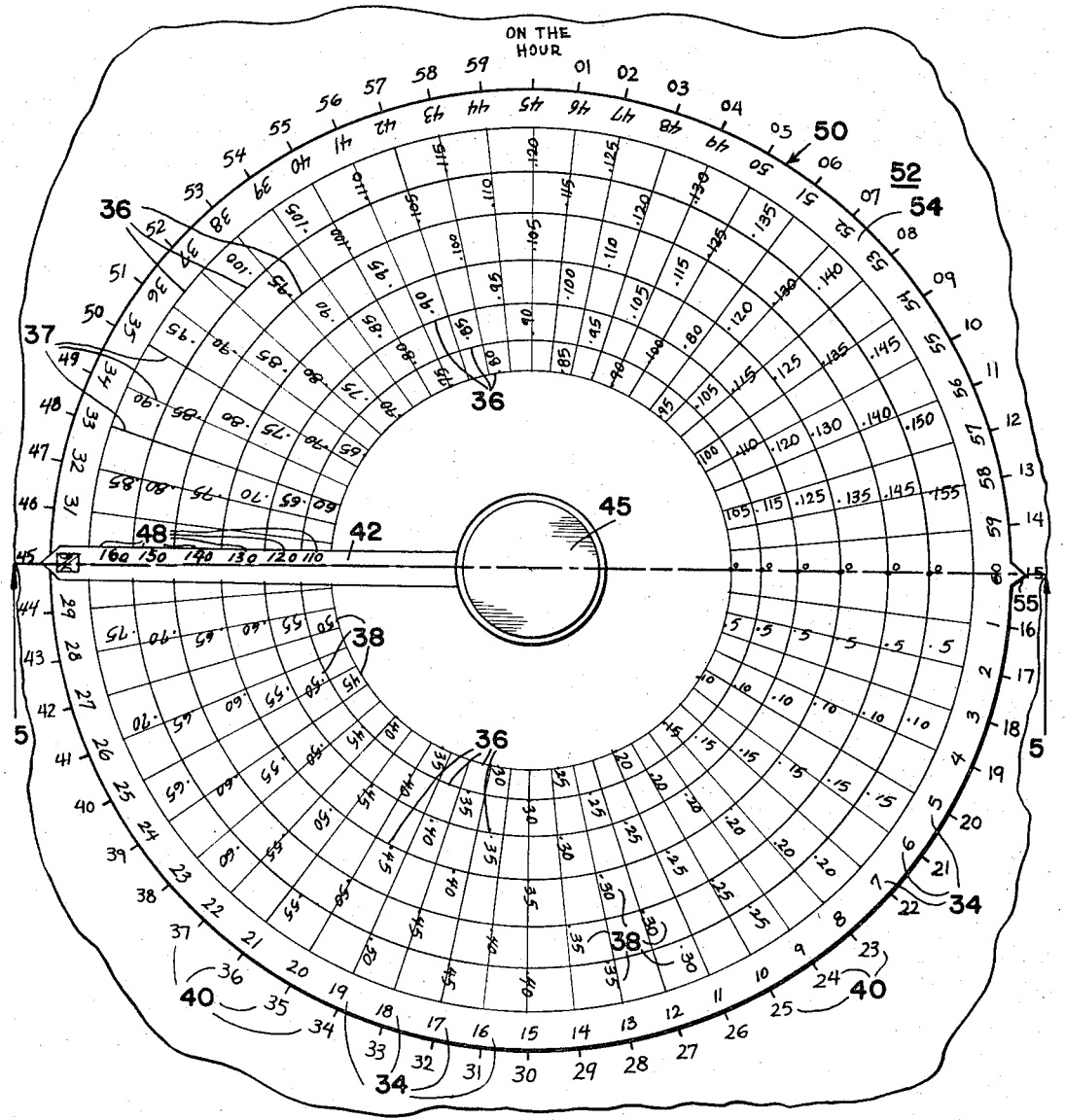
FIG. 4 is a top plan view of another preferred specific embodiment of the computer of my invention.
Figure 5:
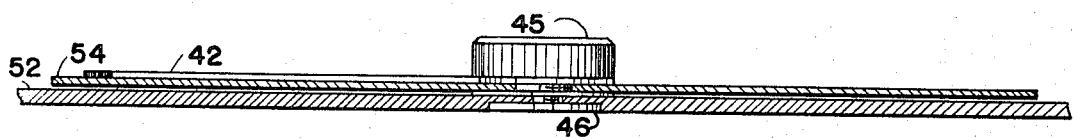
FIG. 5 is a cross sectional view taken on line 5—5 of FIG. 4.

In FIGS. 4 and 5 is depicted another preferred specific embodiment 50 of the computer of my invention. The computer 50 is a portable type computer particularly adapted for general use. The computer 50 has a flat base 52 with a disc 54 rotatably mounted thereon in overlying relationship. A radially extending pointer projection 55 is provided on disc 54 as indicated in FIG. 4. A plurality of evenly spaced concentric circle indicia 36 are provided on the disc. A time scale indicia 34 is disposed along the periphery of disc 54. The time scale indicia consists of numeral indicia from zero to 60 beginning at the pointer projection 55 and progressing clockwise around the periphery of disc 54. A second time scale indicia 40 is disposed on base 52 and spaced outwardly from disc 54. The indicia 40 corresponds to the scale indicia 34 on the disc 54. A second pointer 42 is rotatably mounted on the center of disc 54 with basically the same type knob structure shown in FIG. 3. The pointer 42 can be locked relative to disc 54 with knob 45. Pointer 42 is preferably provided with a viewing aperture adjacent the end overlying time indicia 34. A plurality of velocity indicating indicia 48 are longitudinally arranged on pointer 42. The velocity indicating indicia 48 are positioned on the pointer to assume positions between the concentric circle indicia 36 on the disc. A plurality of of distance scale indicia 38 are positioned between the concentric circle indicia 36 and spaced about the circumference of the disc as shown in FIG. 4. The distance indicating indicia are arranged to correlate the distance traveled with velocity and time as indicated by the velocity indicating indicia 48 and the time scale indicia 34 in basically the same manner illustrated in FIG. 1. The operation and applications of the computer 50 is basically the same as the operation and various applications of the embodiment 10 previously described. In order to adapt the computer 50 to various applications, additional scale indicia, comparable to indicia 34 and 38 but differing in magnitude, are printed on the opposite side of disc 54. In order to convert the computer to the second range, the disc 54 is merely inverted, and a new pointer with appropriate indicia assembled.

Figure 6:
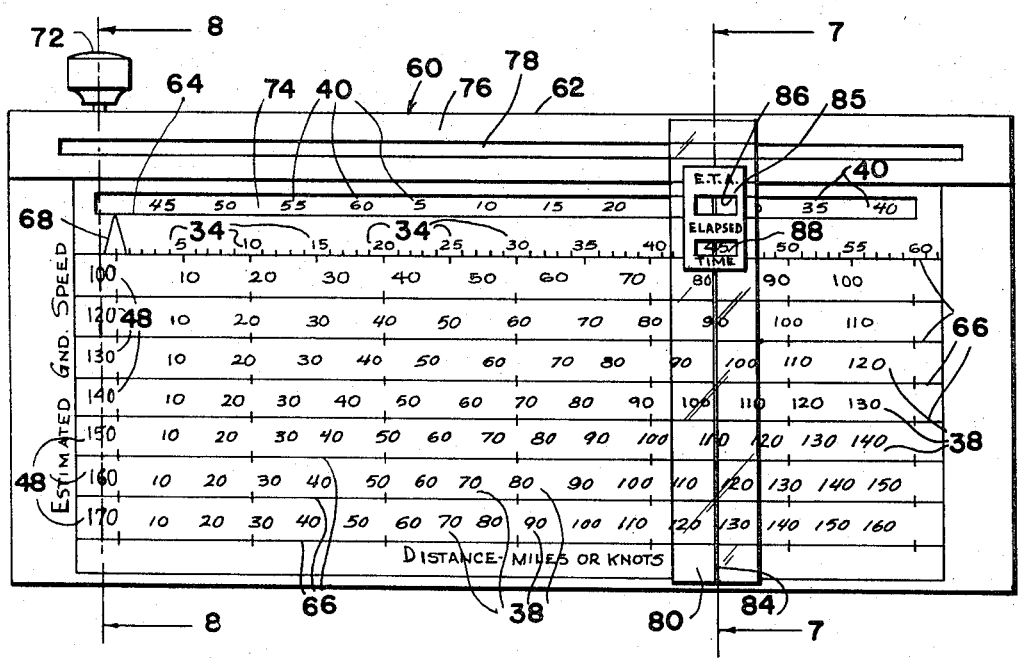
FIG. 6 is a top plan view of still another preferred specific embodiment of the computer of my invention.
Figure 7:
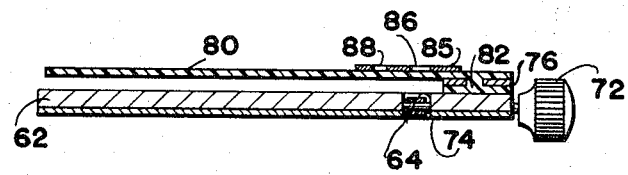
FIG. 7 is a cross sectional view taken on line 7—7 of FIG. 6.
Figure 8:
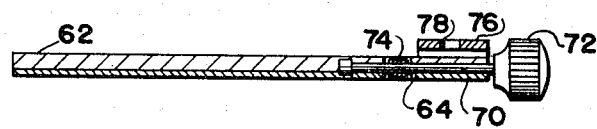
FIG. 8 is a cross sectional view taken on line 8—8 of FIG. 6.

In FIGS. 6 to 8 is depicted still another preferred specific embodiment 60 of the computer of my invention. The computer 60 is illustrated with indicia adapted to correlate time of travel, time of arrival, distance, and velocity. However it is understood that any suitable type indicia can be provided on the computer to adapt same for any desired type of application. The computer 60 has a flat and thin rectangular shaped base 62 having an elongated slot 64 along the upper edge portion. The base is provided with a plurality of parallel line indicia 66 extending across the base and parallel to slot 64. Time scale indicia 34 extends across the base along the upper one of line indicia 66. The time scale indicia is shown with numerals 1 through 60 evenly spaced along line indicia 66. However, the time scale 34 can be changed to any desired magnitude and units. A plurality of numeral velocity indicating indicia 48 are arranged in a column adjacent a left hand portion of the base as most clearly indicated in FIG. 6. A pointer indicia 68 is positioned above the column of the velocity indicating indicia 48, and a plurality of distance scale indicia 38 are arranged on the line indicia 66 with the positioning and spacing of the distance indicating indicia arranged to correlate distance traveled with respect to velocity and time, as indicated by the velocity indicia 48 and time scale indicia 34. Two shafts 70 are rotatably secured to the base 62 and positioned at opposite ends of slot 64 and transverse thereto. Suitable rollers can be secured to the shaft and positioned in the slot 64. A knob 72 is secured to one of said shafts 70 in order to rotate same, as most clearly indicated in FIG. 8 of the drawings. An endless ribbon 74 is supported on the two shafts 70 and disposed in slot 64. Second time scale indicia 40 is printed on ribbon 74, which time scale compares to the values and spacing of the time scale indicia 34. A track means 76 is mounted on the upper portion of the base and extends generally parallel to slot 64. The track 76 is basically a flat elongated element having a slot 78 therein. An elongated transparent pointer 80 is slidably mounted on track 76. The pointer 80 is preferably provided with a projecting portion 82 disposed in slot 78 of track 76. The pointer 80 can be provided with a longitudinally extending line indicia 84 centrally positioned thereon. The pointer 80 can also be provided with a tab 85 having an aperture 86 overlying time scale indicia 40, and a second aperture 88 overlying time scale indicia 34. The computer embodiment 60 previously described is adapted to indicate time of arrival, and time elapsed for various distances when traveling at various velocities.

The use of computer 60 of my invention is basically the same as described in connection with embodiments 10 and 50. Indicia 34 indicate the total elapsed time, indicia 48 indicate velocity, and indicia 40 indicate the estimated time of arrival after the hour. In use the pointer 80 is moved in alignment with the proper distance as indicated in relation to the appropriate ground speed as indicated by indicia 48. The total elapsed time is indicated by indicia 34. The estimated time of arrival will be indicated in the aperture 86 when the initial starting time is indicated by pointed indicia 68. The ribbon 74 can be moved to the proper location relative to the pointer indicia with knob 72.

As will be obvious to those skilled in the art, various changes and modifications of the preferred computers of my invention as described herein can be made or followed without departing from the spirit of the disclosure or the scope of the claims.

I claim:
1. A computer comprising:
 (a) a base having an elongated slot along the upper portion thereof and an elongated pointer on said base adjacent one end of said slot,
 (b) first time scale indicia on said base extending parallel to said slot and a plurality of distance scale indicia arranged in rows positioned parallel to said slot,
 (c) a plurality of velocity indicating indicia on said base arranged in a column extended perpendicular to said slot each aligned with respective ones of each said distance scale indicia,
 (d) a second element being an endless ribbon having a second time scale indicia thereon,
 (e) means for connecting said first element and said ribbon for relative movement,
 (f) said pointer positioned within and movable longitudinally of said slot and rows of said distance scale indicia and having a first aperture overlying said ribbon and a second aperture overlying said first time scale indicia,
 (g) said pointer having a longitudinally extending line indicia extended transversely of said distance scale indicia, and
 (h) said computer adapted to indicate time of arrival and time elapsed for selected distances when traveling at one of the given various velocities.

2. The computer of claim 1 wherein:
(a) said base is flat, thin and rectangular in shape,
(b) said second element having first and second shafts rotatably secured to said first element at opposite ends of said slot extended transverse thereto, a knob secured to one of said shafts, and said endless ribbon supported on said shafts and disposed in said slot,
(c) a track means in the upper portion of said base, and
(d) said pointer being transparent and slidably mounted in said track means to align with and extend across said line indicia with said distance scale indicia, said first time scale indicia, and said second time scale indicia whereby said computer adapted to indicate time of arrival and time elapsed when traveling at a given velocity for a pre-determined distance.

References Cited

UNITED STATES PATENTS

| | | | |
|---|---|---|---|
| 609,619 | 8/1898 | Jolly | 235—84 |
| 2,642,224 | 6/1953 | Christianson | 235—88 |
| 3,111,003 | 11/1963 | Droz | 235—88 |
| 3,127,102 | 3/1964 | Fallis | 235—61 |
| 3,131,858 | 5/1964 | Warner | 235—61 |
| 3,220,643 | 11/1965 | Gorman | 235—88 |
| 3,307,693 | 6/1962 | Du Pont | 235—61 |
| 3,112,874 | 12/1963 | Greiner | 235—61 |
| 3,193,195 | 7/1965 | Jeffries | 235—61 |

RICHARD B. WILKINSON, *Primary Examiner.*

STEPHEN J. TOMSKY, S. A. WAL,
*Assistant Examiners.*